US005919307A

United States Patent [19]

Bernstein, Jr.

[11] Patent Number: 5,919,307

[45] Date of Patent: Jul. 6, 1999

[54] APPARATUS FOR COATING AN INSIDE OF A PIPE OR TUBE

[75] Inventor: Philip Bernstein, Jr., Chicago, Ill.

[73] Assignee: FuseCo. Inc., Chicago, Ill.

[21] Appl. No.: 08/719,619

[22] Filed: Sep. 25, 1996

Related U.S. Application Data

[63] Continuation of application No. 08/441,379, May 15, 1995, Pat. No. 5,618,591.

[51] Int. Cl.[6] ............................ B05B 13/06; B23K 37/04

[52] U.S. Cl. .................................. 118/318; 118/DIG. 10; 118/320; 118/641; 228/48

[58] Field of Search .................................... 118/305, 306, 118/DIG. 10, 320, 622, 641, 55, 408, 409; 427/230, 231, 233, 40; 219/609, 607; 228/48; 406/191, 194

[56] References Cited

U.S. PATENT DOCUMENTS

| | | | |
|---|---|---|---|
| 2,880,109 | 3/1959 | Current et al. | 117/22 |
| 3,982,080 | 9/1976 | Kato et al. | 118/318 |
| 4,490,411 | 12/1984 | Feder | 427/46 |
| 5,059,453 | 10/1991 | Bernsten, Jr. | 427/231 |
| 5,202,160 | 4/1993 | Schuppe et al. | 427/231 |
| 5,413,638 | 5/1995 | Bernstein, Jr. et al. | 118/620 |

*Primary Examiner*—Donald E. Czaja
*Assistant Examiner*—Calvin Padgett
*Attorney, Agent, or Firm*—Welsh & Katz, Ltd.

[57] ABSTRACT

A method of coating an interior surface of a metal tube with a coating material including the steps of filling the tube with a fluid degradable transport material containing a dispersion of the coating material, rotating the tube, and induction heating the tube to a fusion point of the coating material.

5 Claims, 2 Drawing Sheets

APPARATUS FOR COATING AN INSIDE OF A PIPE OR TUBE

FIELD OF THE INVENTION

This is a continuation application of application Ser. No. 08/441,379, filed May 15, 1995, now U.S. Pat. No. 5,618, 591. The field of the invention relates to methods of coating an inside of a pipe or cylinder and in specific to methods of providing corrosion and abrasion protection to interiors of pipes or cylinders.

BACKGROUND OF THE INVENTION

Methods of coating interiors of pipes, tubes and cylinders are known. Such methods are important where the expense of the coating material, or the physical characteristics of the coating material, prohibit the construction of the entire pipe from the coating material.

Coated pipes are typically used to convey corrosive or abrasive liquids, slurries or the like. Products within which coated tubes or cylinders are used include, shock absorbers, McPherson struts, combustion engine cylinder liners, bushings, hydraulic cylinders, oil well pipe, food process piping, nuclear power plant piping, desalinization plant piping, refinery piping, chemical manufacturing, couplings, extrusion barrels (dies), etc.

Chromium or other metals or metal alloys that resist corrosion and wear or provide a good bearing surface are good coating candidates. In strings of pipe used in deep oil wells, for example, it is desirable that the interior surface of the pipe have good resistance to corrosion and wear, so as to extend the time period before failure causing disruption of oil production and removal of the pipe string for replacement. Similarly, strings of pipe which are used to transport concrete slurry from a source of supply to the site of use, must have a wear resistance inner surface in order to withstand the abrasion caused by the aggregate (sand, gravel, and crushed stone) mixed with the cement in the slurry.

It has long been known that ordinary steels may be chrome plated, or the like, to meet surface character requirements for exposure to harsh environments. Chromium, however, is a relatively expensive material producing environmentally detrimental byproducts. Chromium is also difficult to plate onto interior surfaces of tubes.

Other coatings, such as those applied in the form of powders and later fused to a substrate, are also known. Chrome alloys, for example, may be used as a coating in many applications using methods developed for such purpose. Such methods typically include dispersing a coating material inside a spinning pipe, typically using compressed air, and heating the pipe to sufficient temperature as to fuse the coating, but not melt the pipe.

U.S. Patent application No. 4,490,411 to Feder (Feder) is an example of such a process. Under the '411 patent a powdered metallic coating material is delivered to the interior of the tubing through a spray nozzle using a compressed non-oxidizing gas. The tubing is rotated during delivery of the coating material and is heated above a fusion temperature of the coating material using an induction heating process. The fused coating then coats the interior of the pipe.

Because of the spinning, the length of tube that can be practically coated by the Feder process is limited. The process is limited because the nozzle delivering the coating material to the inside of the tube can not be allowed to touch the spinning sidewalls of the tube. Where touching occurs, either the spray distribution of coating material is disrupted or the torque occasioned by the contact causes twisting failure of the structure supporting the nozzle.

A somewhat similar process is described in U.S. Pat. No. 5,059,453 to Bernsten. (Applicant notes that he is the inventor of 5,059,453 and his name was misspelled in the patent. His name Bernstein is used hereafter in this discussion.) In Bernstein the coating material was delivered to the interior of the tubing by inserting metal rods into the tubing. Induction heating of sufficient intensity to fuse the rods is then applied to the tubing as the tubing is rotated at a high rate of speed.

While the coating processes described in Feder and Bernstein may be effective, the distribution of coating material is dependent upon the degree of fluidity of the coating material and rate of spinning of the tube. To achieve an even distribution of coating material, the metal rods of Bernstein must be completely fused for the coating to flow in such a manner as to cover the interior of the pipe and bridge coating gaps. The nozzle of Feder is similarly dependent upon a nozzle geometry for an even distribution of coating materials and fluid flow of melted coating materials to achieve a consistent coating.

Where a tube is not straight or is out of round, spinning cannot be relied upon for an even distribution of coating material and, in fact, causes variation in coating thickness. Portions of an interior of a tube that are close to an axis of rotation will receive very little coating material whereas portions that are relatively far from the axis of rotation will receive a heavier coating.

Accordingly it is an object of this invention to provide a means of coating tubing interiors that provides a more consistent coating thickness than the prior art.

It is a further object of the invention to provide a method of coating tubing interiors that is not dependent on the fluid flow of a coating material for coverage of the tubing interior.

It is a further object of the invention to provide a method of randomly distributing a coating over a tubing interior that is not dependent upon the placement of coating rods.

It is a further object of the invention to provide a method of randomly distributing a coating over a tubing interior that is not affected or limited by the length of the tube.

SUMMARY OF THE INVENTION

The present invention provides a novel coating process for pipe or tubing that substantially overcomes the above problems. Under the invention, a method of coating an interior surface of a metal tube with a coating material is provided which includes the steps of filling the tube with a fluid degradable transport material containing a dispersion of the coating material, rotating the tube, and induction heating the tube to a fusion point of the coating material.

The present invention solves the problem of variability of coating thickness by using foamed material as a vehicle of delivery of the coating material to the tubing wall effecting a uniform, random distribution over the tubing interior. Subsequent heating breaks down the carrier material leaving the coating material behind as a residue.

Spinning of the tubing delivers the foamed carrier material to the hot tubing wall where the heat decomposes the carrier material leaving the coating material deposited uniformly over the interior walls of the tube. Fluxes, such as boron and silicon, ensure a good bond between the coating material and tubing wall and promote fusion.

BRIEF DESCRIPTION OF THE DRAWINGS

The features of the present invention which are believed to be novel are set forth with particularity in the appended claims. The invention, together with further objects and advantages thereof, may be best understood by reference to the following description in conjunction with the accompanying drawings.

DETAILED DESCRIPTION OF A PREFERRED EMBODIMENT

Figure 1:
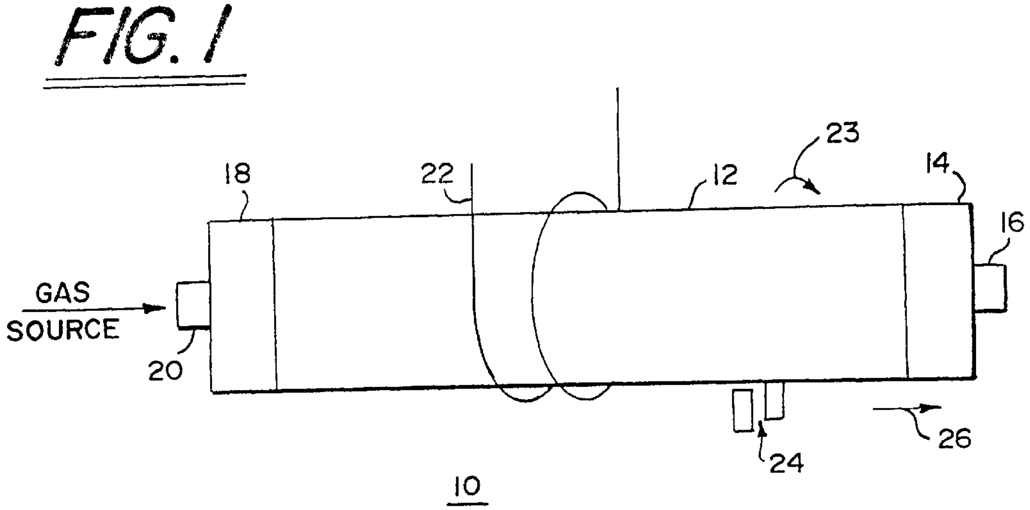
FIG. 1 shows a simplified perspective view of an apparatus for coating a metallic tube in accordance with an embodiment of the invention.
Figure 2:
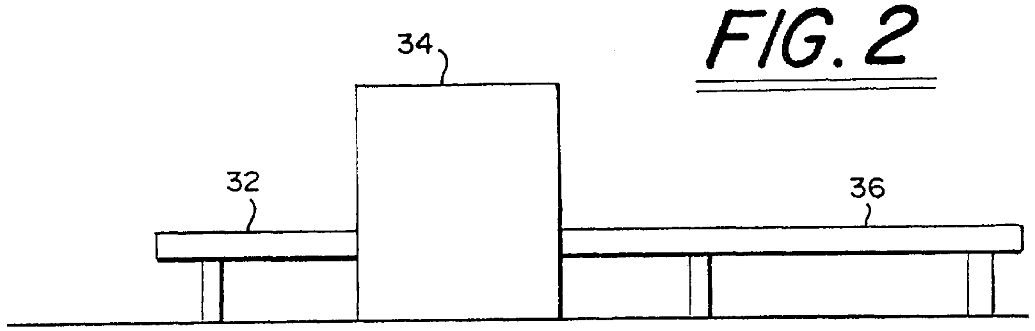
FIG. 2 shows a more detailed view of conveyor and heater of FIG. 1.

FIG. 1 is a semi-graphical representation of the process steps of the coating process in accordance with one embodiment of the invention. It has been determined by the inventor that the coating process described in conjunction with FIG. 1 may be applied to any diameter tube (or pipe) of any wall thickness. It is also to be understood that the process is not limited by the length of the tube and, in fact, may be used with any length tube.

Under the embodiment, a tube 12 to be coated is filled with a fluid degradable transport material (e.g., foamed polystyrene, polymethyl styrene, polyvinyl toluene, polyethylene, polypropylene, phthalate, polymethyl methacrylate etc.) containing a random dispersion of coating material. The tube 12 functions as a mold in containing the initial fill of foamed material and dispersion of coating material. In subsequent process steps the foamed material is decomposed by heating or other means leaving the coating material deposited as a residue on the interior tubing walls.

During the thermal decomposition process, the tube 12 is rotated 23 by multiple sets of drive wheels 24 at a relatively high rate of speed while heat is applied to the tube 12 via an induction heater 22. The tube 12 is advanced 26 through the induction heater 22 by some appropriate drive means which may include the drive wheels 24.

The coating material (e.g., chrome alloy, colmonoy, Inconel, Monel, stainless steel, cermet, molybdenum, nickel, etc.) may be randomly dispersed throughout the foamed material by rapid mixing of the foaming material before foaming or by injection through dual foaming material/coating material nozzle. A gas (e.g., nitrogen, argon, etc.) is used in the foaming of the foaming material to minimize oxygen contamination during the subsequent fusion process. The foaming material may then be reduced to an appropriate particulate size and blown into the tube 12 by known methods. Alternatively, the foaming material may be reduced and the coating material applied to the foaming material by spraying as a slurry where the coating material adheres to an outside surface of the foaming materials by methods well known in the art.

The concentration of coating material mixed with the foaming material is, of course, dependant upon a desired thickness of coating. Concentrations of coating material within the foamed material to form a desired polystyrene mixture 30 for a desired coating thickness are easily calculated by those of skill in the art.

Fluxes (e.g., silicon, boron, etc.) may be added to the coating material dispersed throughout the foamed material as a means of increasing adherence of the coating to the tubing wall. Alternatively, the fluxes may be added to the foamed material before foaming. Such fluxes are known to increase adherence by functioning as a "wetting" agent allowing the coating material to distribute itself evenly over the interior wall of the tube 12. Fluxes are mixed with the coating material in accordance with a ratio (e.g., 1:10) providing best coating performance.

Carbides may be added to increase wear characteristics. Other compounds may be used where appropriate to meet specific use requirements.

Figure 3:
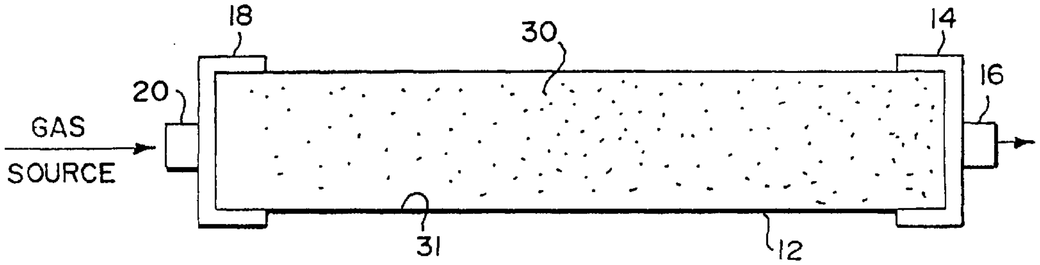
FIG. 3 shows a cut-away view of the tube of FIG. 1.
Figure 4:
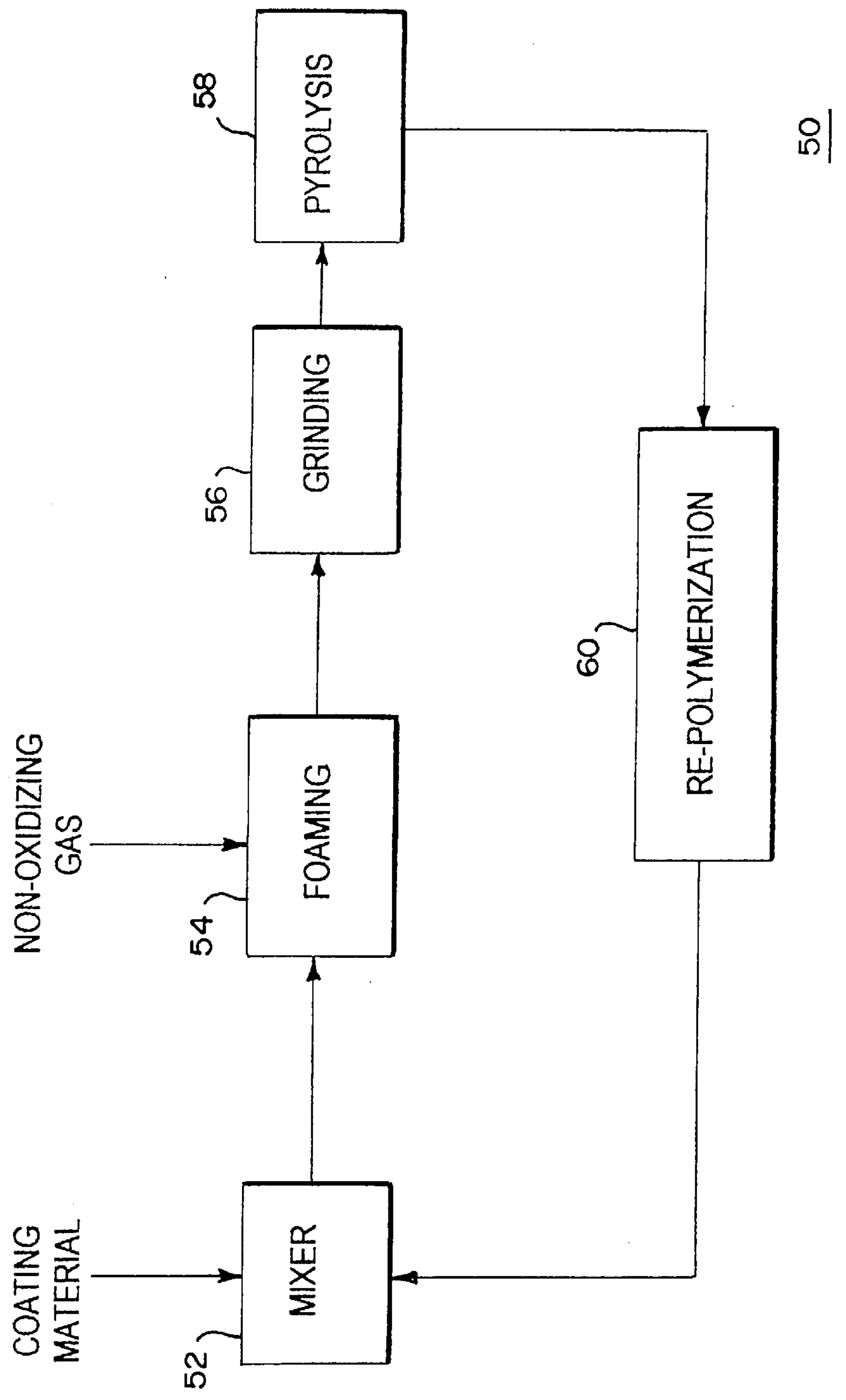
FIG. 4 shows a blower for filling the metallic tube with the fluid degradable transport material.

Before starting the coating process of the tube 12 as shown in FIG. 1, end caps 14, 18 (FIG. 3) are placed on each end of the tube 12 and the tube 12 filled by blowing the foamed material 30 into the tube 12 through one of the end caps 14 using a blower 32 (FIG. 4). The tube 12 may also be turned on-end and the foamed material dumped into the tube 12 using gravity to ensure a complete fill.

After the tube is filled, it may be purged with a non-oxidizing gas (e.g., nitrogen or argon) through a spin fitting 20 located in the end cap 18. During purging, an exhaust fitting (vent valve) 16 is provided in an opposing end cap 14 to vent purged gas from the tube 12 and to ensure complete purging. The vent valve 16 may simply be a low pressure check value or a pressure relief value selected to maintain some pre-selected pressure (e.g., 1–5 psi) within the tube 12 during heating.

Following purging, the tube 12 is placed on a tube rotating device (conveyor) 32. The conveyor 32 is equipped with multiple sets of wheels 24 to insure rapid spinning (e.g., 200 to 2000 rpm) of the tube 12. Purging of the tube 12 through spin fitting 20 may continue during heating of the tube 12.

The conveyor 32 may also advance the tube 12 into, and through, the induction heater 34. The conveyor may advance the tube through use of a piston or by some other appropriate mechanism (e.g., offsetting an axis of rotation of the drive wheels 24 by a few degrees from the axis of travel of the tube 12 resulting in a helical drive mechanism). Alternatively the tubing may be rotated in place and the induction heater 34 may be moved to traverse the length of the tube 12.

Spacing of the drive wheels 24 is determined based upon an overall diameter of the tube 12. To reduce distortion of the tube 12, the spacing of the drive wheels 24 proximate the exit of the induction heater 34 must be increased to accommodate the increase in diameter accompanying the heating of the tube 12. The increased spacing of the drive wheels 24 is gradually decreased with distance from the exit of the induction heater 34 depending on the level of residual heat remaining in the tube 12 as the tube 12 passes that part of the conveyor 36.

The induction heater 34 operates at a frequency appropriate to the geometry and size of the tube 12 (e.g., 10 kHz). The power output of the induction heater is also sized for the tube 12 and the desired rate of work output (e.g., 100 kW). While the work coil 22 of FIG. 1 is shown as consisting of a single coil, it is understood that work coil 22 may be comprised of one or more coils 22.

During application of heat to the tube 12 from the induction heater 34, the foamed material 30 in contact with the walls of the tube 12 first melts and then rapidly breaks down (decomposes) into its constituent parts through the process of pyrolysis in the absence of oxygen. As the foamed material 30 decomposes and begins to pyrolyze, the coating material is driven onto the matrix structure of the interior wall of the tube 12 by centrifugal forces resulting from the rapid spinning of the tube 12. The pyrolysate resulting from pyrolysis of the foamed material 30 flows from the tube 12 through the rotating gas (spin) fitting 20. The gas exits the tube 12 through the valve 16.

Continued purging of the tube 12 may cause a substantially complete removal of the gaseous components of the foamed material.

It has been determined that the quality of the finished coating 31 may be directly related to the removal of the contaminants. A substantially complete removal of the contaminants results in a substantially continuous coating with a minimum of defects (e.g., pin-holes, slag, etc.). A less complete removal may result in a proportional increase in defects.

Residual heat in the walls of the tube 12 maintains the temperature of the walls above the dew point of any water vapor liberated during pyrolysis. Since the tube walls are above the dew point of water vapor, the water, once converted to the gaseous phase, does not re-condense. Since there is no condensation, purging allows for the substantially complete removal of contaminants.

Since the tube 12 rotates rapidly, the foamed material 30 breaks down at a constant rate around the periphery of the inside of the tube 12. As each particle breaks down, it is replaced with a new particle moving out from the central portion of the tube 12 under the influence of the centrifugal force of spinning. Movement of particles of the foamed material 30 from the central portion of the tube 12 to the tube walls (where breakdown occurs) is completely random. As each particle breaks down, the particle leaves behind a small amount of coating material on the tube wall. Since the movement of particles resulting in the deposition of coating material occurs in a random manner the end result is an extremely uniform layer of coating material 31 on the walls of the tube 12.

Since the coating 31 is uniform, there is no reason to heat the coating 31 significantly above a fusion point for purposes of redistributing the coating material on the interior surface of the tube 12. A uniform, adherent, protective coating is achieved, in fact, by raising the temperature of the coating 31 only to the fusion point or slightly above the fusion point. Also, since the coating 31 is not raised substantially above a fusion point the coating 31 does not have gaps in the coating associated with high spots on the interior surfaces of the tube 12 where the coating has flowed away from such high spots.

Following the heating process the tube 12 is moved to a cooling conveyor 36 where spinning and purging continue for a period as the tube 12 cools. Continuing the spinning and purging allows the coating to further harden without the possibility of the coating flowing and forming pools on the bottom of the tube 12. Alternately, the tube 12 may be quenched immediately after induction heating by water quenching. Following the cooling period, the tubes 12 may be removed from the cooling conveyor 36 and placed on racks where the tube 12 may be further cooled to room temperature. When the tube 12 is cooled to room temperature, the end caps 16, 18 may be removed or left in place to protect any threading that may have been previously placed on the ends of the tube 12.

Alternatively, the hot tube 12 may be moved to a bender (not shown) where the tube 12 may be subject to certain bending operations consistent with a desired end product. Since the coating on the interior wall of the tube 12 is of a consistent thickness, bending is much less likely to cause cracking of the coating than those coatings applied under prior art processes. The consistent coating also allows the tube 12 to be cooled as, described above, followed by later heating and bending to a desired shape.

To prepare the tube 12 for coating, certain process steps must also be taken to ensure good adherence of the coating to the tube 12. Before filling the tube 12 with the foamed mixture, scale or other contaminants may be removed by sandblasting. Alternatively, bead blasting (e.g., using aluminum-oxide)may be used for abrasive surface cleaning. Pickling in a mild acid (e.g., sulfuric) may also be used as a cleaning agent.

Following scale removal the interior of the tube may be subjected to a final cleaning step to remove any debris dislodged by the abrasive cleaning. The final cleaning step may include rinsing the interior of the tube with a solvent (e.g., acetone, alcohol, etc.). Following the cleaning steps, the tube 12 is dried and the end caps 16, 18 installed to prevent further contamination, or the tube 12 may be immediately filled with the polystyrene mixture 30. If the tube 12 is immediately filled, the filling step may be followed by a purge to remove solvent vapors and oxygen. Following purging, the tube may be processed as described above to produce the desired coating.

FIG. 4 is a block diagram showing process steps in the flow of the fluid degradable transport material 30. Under an embodiment of the invention, a polymer of the fluid degradable transport material 30 is mixed with the coating material 31 within a mixer 52 at a temperature above the melting point of the polymer. The fluid degradable transport material 30 and coating material 31 is then foamed within a foamer 54 using a non-oxidizing gas. The transport material 30 may then be ground to particulate within a grinder 56 or injected directly into the tube 12 during foaming.

Following grinding the mixed transport material 30 and coating material 31 may then be loaded into the tubing 12 and pyrolyzed. During pyrolysis, some of the polymers of the transport material 30 are de-polymerized into monomers, such a styrenes or methane which must then be purged from the tube 12 during normal processing.

Purging of pyrolysates from the tube 12 and discharge into the atmosphere, on the other hand, presents an environmental problem. Current air pollution laws, in some cases, strongly discourage such discharges.

Under the embodiment, discharge of the pyrolysates into the atmosphere is avoided by re-forming the pyrolysates into a polymer suitable for use as a fluid degradable transport material 30. The pyrolysates are re-formed using a re-polymerization process step 60 where the pyrolosates are combined at an appropriate pressure and heat using appropriate catalysts, and raw materials (e.g., carbon and hydrogen) to produce a polymer suitable for re-use in subsequent process cycles.

In another embodiment of the invention, the transport material is in the form of a solid rod of an organic material (e.g., wax, plastic, etc.) containing a dispersion of coating material. In use, an appropriate length of the rod (e.g. equal in length to the length of the pipe to be coated) is inserted into the tube 12 and the tube is rotated. As the tube is rotated, a moving section of the tube is induction heated to a melting point of the coating amterial. The induction heating causes the solid rod containing the coating material to melt and to disperse itself and the coating material around the periphery of the tube. Continued induction heating causes the transport material of the solid rod to degrade and be driven off and for the coating material to melt and line the inner surface of the tubing 12.

A specific embodiment of a process for coating tubes according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. An apparatus for coating an interior surface of a metal tube with a metallic coating material comprising: an organic transport material containing a dispersion of the metallic coating material, said organic transport material further comprising a foamed one of the group including polystyrene, polymethyl styrene, polyvinyl toluene, polyethylene, polypropylene, phthalate, and polymethyl methacrylate and said organic transport material and dispersion of coating material being disposed within the tube; means located underneath the tube for rotating the tube containing the organic transport material and dispersion of metallic coating material within the tube; induction heating means surrounding the tube for induction heating the tube to a fusion point of the coating material to cause the coating material to fuse with and line an inner surface of the tube while driving off the organic transport material as a gaseous byproduct; and grinding means positioned and arranged away from the tube for grinding the foamed material into particulate before placement into the tube.

2. The apparatus as in claim 1 further comprising mixing means in flow communication with the grinding means for mixing the coating material with the organic transport material before foaming.

3. The apparatus as in claim 1 further comprising spraying means for spraying the coating material onto the ground particulate as a slurry coupled to an output of the grinding means.

4. The apparatus as in claim 1 further comprising means for blowing the organic transport material into the tube.

5. An apparatus for coating an interior surface of a metal tube with a metallic coating material comprising: an organic transport material containing a dispersion of the metallic coating material said organic transport material further comprising a foamed one of the group including polystyrene, polymethyl styrene, polyvinyl toluene, polyethylene, polypropylene, phthalate, and polymethyl methacrylate and said organic transport material and dispersion of coating material being disposed within the tube; means located underneath the tube for rotating the tube containing the organic transport material and dispersion of metallic coating material within the tube; induction heating means surrounding the tube for induction heating the tube to a fusion point of the coating material to cause the coating material to fuse with and line and inner surface of the tube while driving off the organic transport material as a gaseous byproduct; grinding means positioned and arranged away from the tube for grinding the foamed material into particulate; and mixing means in flow communication with said grinding means for mixing the coating material with the particulate before placement into the tube.

* * * * *